(12) United States Patent
Puckett

(10) Patent No.: US 12,745,033 B1
(45) Date of Patent: Sep. 22, 2026

(54) ACCELEROMETER-BASED AUDIO SIGNAL GENERATOR

(71) Applicant: Noah Puckett, Gettysburg, PA (US)

(72) Inventor: Noah Puckett, Gettysburg, PA (US)

( * ) Notice: Subject to any disclaimer, the term of this patent is extended or adjusted under 35 U.S.C. 154(b) by 0 days.

(21) Appl. No.: 19/374,418

(22) Filed: Oct. 30, 2025

(51) Int. Cl.

| | |
|---|---|
| ***G10H 1/34*** | (2006.01) |
| ***G01P 1/08*** | (2006.01) |
| ***H04R 1/02*** | (2006.01) |
| ***H04R 1/22*** | (2006.01) |
| ***H05B 45/20*** | (2020.01) |
| ***H05B 47/105*** | (2020.01) |
| ***H05B 47/155*** | (2020.01) |

(52) U.S. Cl.
CPC .................. *H04R 1/22* (2013.01); *G01P 1/08* (2013.01); *H04R 1/025* (2013.01); *H04R 1/028* (2013.01); *H05B 45/20* (2020.01); *H05B 47/105* (2020.01); *H05B 47/155* (2020.01)

(58) Field of Classification Search
CPC ....... G10H 2220/391; G10H 2220/395; G10H 2220/401
See application file for complete search history.

(56) References Cited

U.S. PATENT DOCUMENTS 4,337,948 A * 7/1982 Breslow .................... A63F 9/24 273/237
4,575,087 A * 3/1986 Sinclair ................. A63F 9/0001 273/153 R
4,662,260 A * 5/1987 Rumsey .................... G10H 1/34 84/672

(Continued)

FOREIGN PATENT DOCUMENTS

CN 108257586 A * 7/2018 ........... G10H 1/0083
CN 111862910 B 7/2024

(Continued)

OTHER PUBLICATIONS

Author Unknown, "Accelerometer Guide," [website], Phidgets, last edited Jan. 16, 2024. [Accessed Apr. 8, 2026, publicly available at URL: https://www.phidgets.com/docs/Accelerometer_Guide], 7 pages.

(Continued)

*Primary Examiner* — Ryan Robinson
(74) *Attorney, Agent, or Firm* — COOLEY LLP

(57) ABSTRACT

A non-transitory, processor-readable medium storing instructions that, when executed by a processor, cause the processor to receive, from a multi-axis sensing device, a signal that encodes a plurality of measurements associated with a plurality of axes. A signal that encodes a plurality of audio frequencies is generated to cause an electroacoustic transducer to emit a plurality of sound waves associated with the plurality of audio frequencies, each audio frequency from the plurality of audio frequencies being associated with a different axis from the plurality of axes. A signal is also generated to cause a light emitting device to emit light (1) in a plurality of directions and (2) having a plurality of colors, each color from the plurality of colors being associated with a different direction from the plurality of directions, and each direction from the plurality of directions being associated with a different axis from the plurality of axes.

20 Claims, 6 Drawing Sheets

(56) References Cited

U.S. PATENT DOCUMENTS 4,776,253 A * 10/1988 Downes ................... G10H 1/00 84/645
4,801,141 A * 1/1989 Rumsey ................... G10H 1/00 984/301
4,836,075 A * 6/1989 Armstrong ............... G10H 1/00 984/301
5,177,311 A * 1/1993 Suzuki ..................... G10H 1/34 84/DIG. 12
5,290,964 A * 3/1994 Hiyoshi ................... G10H 1/32 84/622
5,541,358 A * 7/1996 Wheaton .................. G10H 1/00 84/645
6,215,978 B1 * 4/2001 Ruzic ....................... A63H 5/00 273/153 R
6,297,438 B1 * 10/2001 Por Paul .................. G10H 1/32 84/743
6,867,361 B2 * 3/2005 Nishitani ............. G10H 1/0008 84/730
7,169,998 B2 * 1/2007 Kondo ................. G10H 1/0008 84/615
7,183,477 B2 * 2/2007 Nishitani ............. G10H 1/0066 84/602
7,183,480 B2 * 2/2007 Nishitani ........... A63B 71/0686 84/723
7,474,197 B2 * 1/2009 Choi .................... G10H 1/0008 340/384.1
7,807,913 B2 * 10/2010 Choi ................ H04M 1/72442 84/723
7,923,623 B1 * 4/2011 Beaty ................... G10H 1/0091 84/701
8,222,507 B1 * 7/2012 Salazar ................ G10H 1/0033 84/602
8,710,347 B2 * 4/2014 Harada .................... G10H 1/14 84/723
8,878,043 B2 * 11/2014 Cheever ................... G10H 1/38 84/613
9,123,268 B2 * 9/2015 Uehara .................... G10H 1/32
9,269,340 B2 * 2/2016 Udell, III ................ H04W 4/70
10,152,958 B1 * 12/2018 Sheely ................. G10H 1/0553
10,203,203 B2 * 2/2019 Sakurai .................. G10H 1/053
11,393,437 B2 * 7/2022 Nauer .................. G10H 1/0008
11,942,066 B2 * 3/2024 Yamate ..................... G10H 1/34
2002/0126014 A1 * 9/2002 Nishitani ............. G10H 1/0083 340/384.1
2003/0041721 A1 * 3/2003 Nishitani ................. G10H 1/00 84/609
2003/0045274 A1 * 3/2003 Nishitani ............. G10H 1/0058 455/414.1
2007/0012167 A1 * 1/2007 Bang .................... G10H 1/0008 84/723
2008/0250914 A1 * 10/2008 Reinhart .............. G10H 1/0025 84/645
2011/0287806 A1 * 11/2011 Vasudevan ........ H04M 1/72442 455/556.1
2012/0006181 A1 * 1/2012 Harada ................ G10H 1/0008 84/600
2012/0024128 A1 * 2/2012 Takahashi ............ G10H 1/0008 84/600
2012/0244969 A1 * 9/2012 Binder ................. A63B 43/004 473/570
2017/0337909 A1 * 11/2017 Sullivan ............... G10H 1/0008
2018/0286366 A1 * 10/2018 Oguro .................... G10H 1/368
2021/0358323 A1 * 11/2021 Kajihara .................. G10G 7/00
2022/0270576 A1 * 8/2022 Hellat .................. G10H 1/0025
2025/0140222 A1 * 5/2025 Swain .................... G10H 7/002

FOREIGN PATENT DOCUMENTS

DE 102007054815 A1 * 5/2009 ........... G10H 1/0008
GB 2510825 A * 8/2014 ........... G10H 1/0025
GB 2526278 A * 11/2015 ............... G10H 1/34
WO WO-2013061998 A1 * 5/2013 ........... G10H 1/0008

OTHER PUBLICATIONS

Author Unknown, “ARQ AR-48: A Fun New Way to Create Electronic Music,” [website], Zoom. [Accessed Aug. 18, 2025, publicly available at URL: https://zoomcorp.com/en/us/digital-instruments/digital-instruments/arq-ar-48/], 11 pages.
Author Unknown, “Making Music with the Accelerometer,” [website], ArcBotics. [Accessed Aug. 18, 2025, publicly available at URL: https://arcbotics.com/lessons/ardublock-making-music-with-the-accelerometer/], 5 pages.
Author Unknown, “What are accelerometers? Explain how they work, what they measure, and how they are used,” [website], Epson. [Accessed Apr. 8, 2026, publicly available at URL: https://www.epsondevice.com/sensing/en/tech/column/accelerometer/], 14 pages.
Barrass, “Mozzi: Sound synthesis library for Arduino,” [website], Mozzi. [Accessed Apr. 8, 2026, publicly available at URL: https://sensorium.github.io/Mozzi/], 7 pages.
Campbell, “How to Control LEDs on the Arduino,” [website], Circuit Basics, Dec. 29, 2014. [Accessed Apr. 8, 2026, publicly available at URL: https://www.circuitbasics.com/arduino-basics-controlling-led/], 30 pages.
Costa-Giomi et al., “Digital Music Toys for Young Children: Parents’ Review of the Munchkin Mozart MagicTM Cube,” Texas Music Education Research, 2014, 8 pages.
James, “How to Build an Arduino Speaker That Plays Music in Minutes,” [website], Maker Pro, Nov. 21, 2015. [Accessed Apr. 8, 2026, publicly available at URL: https://maker.pro/arduino/projects/arduino-speaker], 5 pages.
Puckett, Noah, “The ChordCube: Invention Log,” [conference presentation], presented at the Invention Convention, Dearborn, Michigan, Jun. 4-6, 2025, 36 pages.
Sanders, “GAMs students excel in TSA,” [website] Gettysburg Times, May 16, 2023. [Accessed Nov. 25, 2025, publicly available at URL: https://www.gettysburgtimes.com/news/local/article_6ce5be18-0539-57a6-b81b-b97bc3a04be0.html], 4 pages.
Sound Simulator, “Accelerometer Music Controller (Arduino Tutorial),” [video], YouTube, uploaded Jan. 5, 2022, 4 minutes. [Accessed Apr. 8, 2026, publicly available at URL: https://www.youtube.com/watch?v=Wzjms3tgF6w], 10 pages.
TechGuru, “LED Anode vs Cathode—Difference Between and How to Identify,” [website], NerdTechy, Mar. 8, 2022. [Accessed Apr. 8, 2026, publicly available at URL: https://nerdtechy.com/led-anode-vs-cathode-difference], 7 pages.
Wexler et al., “A Touch on Musical Innovation: Exploring Wearables and Their Impact on New Interfaces for Musical Expression,” Sensors (Basel), (Dec. 31, 2023), 24(1):250; 16 pages.
ZoomSoundLab, “Zoom ARQ Tutorials: Master Effects and Accelerometer,” [video], YouTube, uploaded Sep. 19, 2016, 3 minutes. [Accessed Apr. 8, 2026, publicly available at URL: https://www.youtube.com/watch?v=q9Hp3L-KRrs], 8 pages.

* cited by examiner

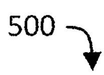

Receive, from a multi-axis sensing device, a signal that encodes a plurality of measurements associated with a plurality of axes
502

Generate a signal that encodes a plurality of audio frequencies to cause an electroacoustic transducer to concurrently emit a plurality of sound waves associated with the plurality of audio frequencies, each audio frequency from the plurality of audio frequencies being associated with a different axis from the plurality of axes
504

Generate a signal to cause a light emitting device to emit light (1) in a plurality of directions and (2) having a plurality of colors, each color from the plurality of colors being associated with a direction different from at least one remaining direction from the plurality of directions, and each direction from the plurality of directions being associated with a different axis from the plurality of axes
506

FIG. 5

ACCELEROMETER-BASED AUDIO SIGNAL GENERATOR

FIELD

One or more embodiments described herein relate to an apparatus configured to generate multi-tone audio signals based on multi-axis measurements.

BACKGROUND

A need exists for an interactive musical device that facilitates motor skills and eye-hand coordination while still being easy to use.

SUMMARY

According to an embodiment, an apparatus includes a body that defines an internal volume. The apparatus further includes a multi-axis sensing device disposed within the internal volume and oriented based on an alignment between (1) a plurality of sides of the body and (2) a plurality of axes associated with the multi-axis sensing device. Additionally, the apparatus includes an electroacoustic transducer disposed within the internal volume, as well as a processor disposed within the internal volume. The apparatus also includes a non-transitory memory disposed within the internal volume and storing instructions that, when executed by the processor, cause the processor to receive, from the multi-axis sensing device, a signal that encodes a plurality of measurements associated with the plurality of axes. The instructions also cause the processor to generate a signal that encodes a plurality of audio frequencies based on the plurality of measurements, to cause the electroacoustic transducer to concurrently emit a plurality of sound waves associated with the plurality of audio frequencies, each audio frequency from the plurality of audio frequencies being associated with a different axis from the plurality of axes.

According to an embodiment, a non-transitory, processor-readable medium stores instructions that, when executed by a processor, cause the processor to receive, from a multi-axis sensing device, a signal that encodes a plurality of measurements associated with a plurality of axes. A signal that encodes a plurality of audio frequencies is generated to cause an electroacoustic transducer to concurrently emit a plurality of sound waves associated with the plurality of audio frequencies, each audio frequency from the plurality of audio frequencies being associated with a different axis from the plurality of axes. A signal is also generated to cause a light emitting device to emit light (1) in a plurality of directions and (2) having a plurality of colors, each color from the plurality of colors being associated with a different direction from the plurality of directions, and each direction from the plurality of directions being associated with a different axis from the plurality of axes.

According to an embodiment, a system includes (1) a body that defines an internal volume, (2) a multi-axis sensing device disposed within the internal volume, (3) an electroacoustic transducer disposed within the internal volume, (4) a light emitting device disposed within the internal volume, (5) a processor disposed within the internal volume, and (6) a non-transitory, processor-readable medium disposed within the internal volume. The non-transitory, processor-readable medium stores instructions that, when executed by the processor, cause the processor to receive, from the multi-axis sensing device, a signal that encodes a plurality of measurements associated with a plurality of axes. The instructions also cause the processor to generate a signal that encodes a plurality of audio frequencies to cause the electroacoustic transducer to concurrently emit a plurality of sound waves associated with the plurality of audio frequencies, each audio frequency from the plurality of audio frequencies being associated with a different axis from the plurality of axes. The instructions further cause the processor to generate a signal to cause the light emitting device to emit light (1) in a plurality of directions and (2) having a plurality of colors, each color from the plurality of colors being associated with a direction different from at least one remaining direction from the plurality of directions, and each direction from the plurality of directions being associated with a different axis from the plurality of axes.

BRIEF DESCRIPTION OF THE DRAWINGS

FIG. 5 is a flow diagram illustrating a method for causing an electroacoustic transducer to concurrently emit a plurality of sound waves associated with a plurality of audio frequencies, according to an embodiment.

DETAILED DESCRIPTION

Figure 1:
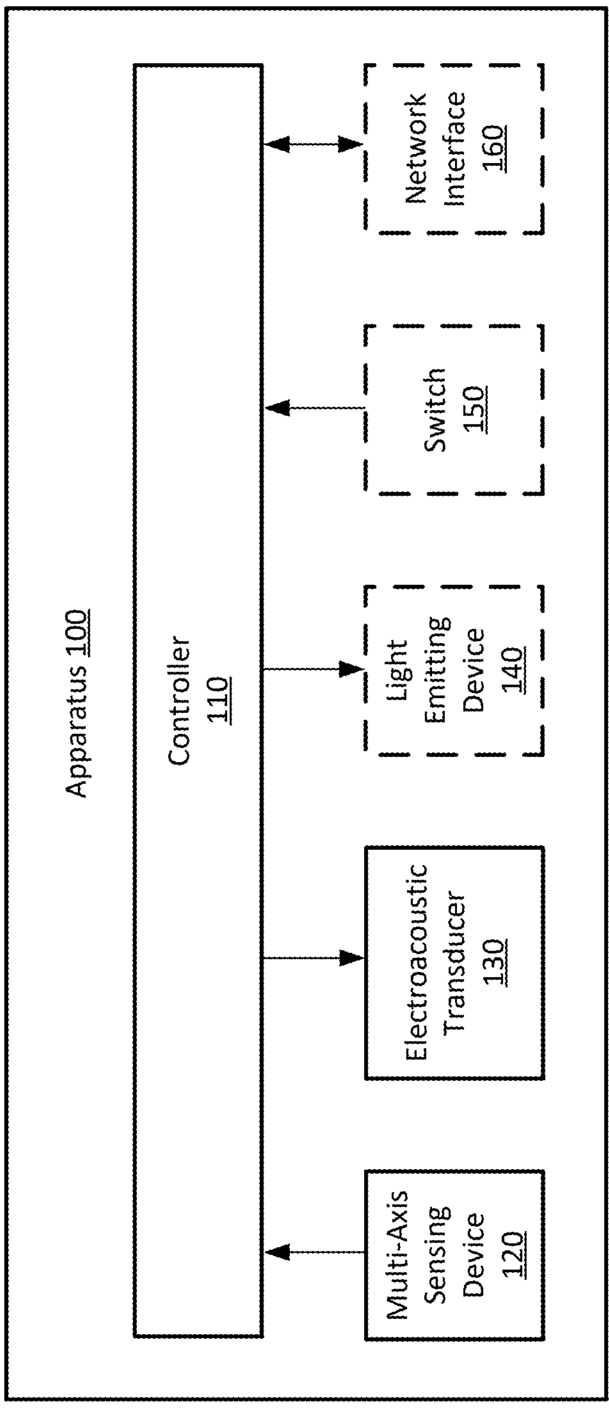
FIG. 1 is a schematic block diagram of an apparatus, according to an embodiment.

FIG. 1 is a schematic block diagram of an apparatus 100, according to an embodiment. The apparatus 100 includes a controller 110, a multi-axis sensing device 120, and an electroacoustic transducer 130. Optionally, the apparatus 100 can further include a light emitting device 140, a switch 150, and/or a network interface 160. In some implementations, the apparatus 100 can be functionally and/or structurally similar to the apparatus 400 of FIGS. 4A-4B. In some implementations, the controller 110 can be functionally and/or structurally similar to the compute device 210 of FIG. 2, the compute device 220 of FIG. 2, and/or the compute device 301 of FIG. 3. In some implementations, the network interface 160 can be functionally and/or structurally similar to the network interface 330 of FIG. 3.

The controller 110 can be configured to receive signals from the multi-axis sensing device 120 and/or the switch 150, as described further herein. The controller 110 can further send signals to control the electroacoustic transducer 130 and/or the light emitting device 140, as described further herein. In some embodiments, the controller 110 can communicate, via the network interface 160, with another controller in an apparatus that is different from the apparatus 100, as described herein (e.g., similar to the compute devices 210 and 220 of FIG. 2).

The multi-axis sensing device 120 can include, for example, a multi-axis accelerometer, a multi-axis gyroscope, a multi-axis tilt sensor, a multi-axis inclinometer, and/or the like. The multi-axis sensing device 120 can be oriented relative to the apparatus 100 (e.g., within an internal volume defined by the apparatus 100) such that axes of the multi-axis sensing device 120 are aligned relative to surfaces of the apparatus 100. For example, in some implementations, the apparatus 100 can have a body that has a cube shape (e.g., as shown in FIGS. 4A-4B), and the multi-axis sensing device 120 can include a three-axis sensing device (e.g., having an x-axis, a y-axis, and a z-axis). The multi-axis sensing device 120 can be oriented such that each of these axes is perpendicular to a different surface of the apparatus 100. In some implementations, the multi-axis sensing device 120 can be oriented (e.g., within an internal volume of the apparatus 100) such that each axis intersects a different surface of the apparatus 100. The multi-axis sensing device 120 can produce measurement data that can be processed by a measurement data analyzer (e.g., functionally and/or structurally similar to the measurement data analyzer 314 of FIG. 3, described herein). In some implementations, this measurement data analyzer can be implemented by the controller 110.

The electroacoustic transducer 130 (e.g., an electromagnetic acoustic transducer, a speaker, etc.) can include a device configured to generate acoustic waves (e.g., emit sound waves) having a plurality of frequencies. The plurality of frequencies can be encoded by a signal generated by a multi-tone signal generator that is functionally and/or structurally similar to the multi-tone signal generator 316. This multi-tone signal generator can be implemented by the controller 110. In some implementations, each frequency from the plurality of frequencies can be associated with a different surface of the apparatus 100. In some implementations, the plurality of encoded frequencies can be selected from a larger set of frequencies based on measurement data produced by the multi-axis sensing device 120, as described herein. This larger set of frequencies can be associated with a plurality of surfaces and/or faces of the apparatus 100. For example, in some embodiments (e.g., as described further herein at least in relation to FIGS. 4A-4B), the apparatus 100 can have a cube shape having six surfaces and/or faces. As a result, the set of frequencies can include six frequencies, such that a subset of frequencies from the six frequencies can be emitted by the electroacoustic transducer 130 based on orientation of the apparatus 100 relative to gravity, as described herein.

The light emitting device 140 can include a plurality of light emitters (e.g., light emitting diodes (LEDs)). In some implementations, each light emitter can be configured to emit light having a different color. Each color can be associated with a different frequency from the set of frequencies described above. Similarly stated, each color can be associated with a different surface and/or face of the apparatus 100. Each light emitter can be oriented to align with an axis associated with the multi-axis sensing device 120, for example, as described further herein at least in relation to FIGS. 4A-4B. A multi-light signal generator (e.g., structurally and/or functionally similar to the multi-light signal generator 318) can cause the light emitting device 140 to emit light via a light emitter(s) for each surface associated with a frequency (or frequencies) concurrently encoded by the multi-tone signal generator. As a result, a face(s) of the apparatus 100 can be illuminated, based on that face(s) orientation relative to gravity, and this illumination can be associated with tones that are played via the electroacoustic transducer 130. In some implementations, faces of the apparatus 100 can include translucent surfaces, such that the light emitting device 140 can be disposed within an internal volume of the apparatus 100, and light can be emitted from the light emitting device 140 through the translucent surfaces.

The switch 150 can include an electrical switch (e.g., a slide switch, a push-button switch, a rocker switch, and/or the like). In response to receiving a signal from the switch 150 (e.g., a digital high signal, a digital low signal, etc.), the controller 110 can implement a tone shifter (e.g., functionally and/or structurally similar to the tone shifter 319 of FIG. 3) to cause a shift in the plurality of frequencies sounded by the electroacoustic transducer 130. In some implementations, this shift can include a predetermined offset (e.g., a one-third octave shift), as described further herein.

The network interface 160 can include a transceiver configured to facilitate detection of and/or communication with another apparatus (e.g., different from but functionally and/or structurally similar to the apparatus 100). For example, in response to the controller 110 detecting the presence of another apparatus via the network interface 160, the controller 110 (of the apparatus 100) can (1) cause a shift in the plurality of frequencies sounded by the electroacoustic transducer 130 (of the apparatus 100) and/or (2) cause a shift in a plurality of frequencies sounded by an electroacoustic transducer of the other apparatus. In some implementations, this shift can include a predetermined offset, such that the plurality of frequencies sounded by the apparatus 100 and the plurality of frequencies sounded by the other apparatus results in harmonic consonance.

Figure 2:
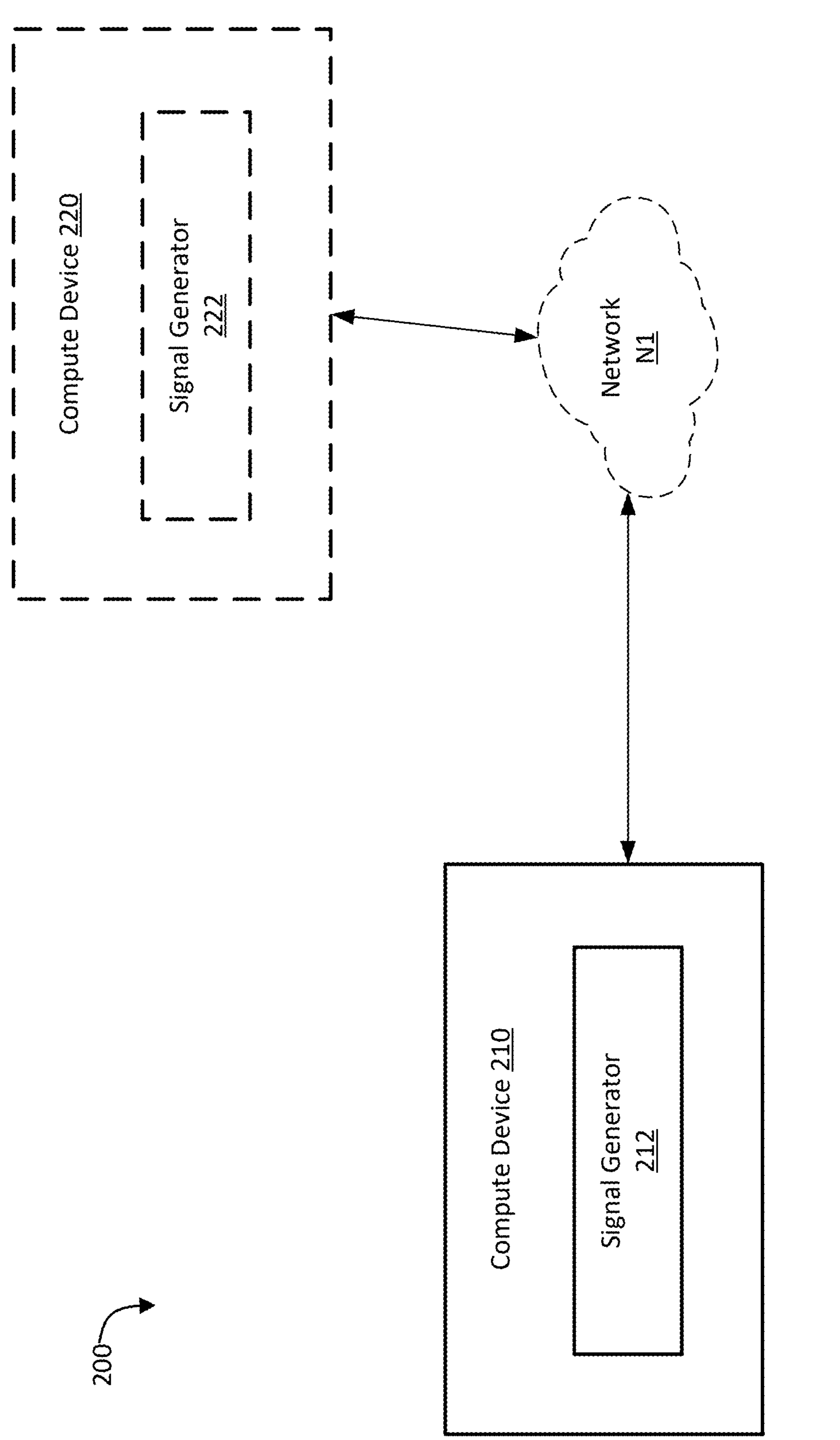
FIG. 2 is a schematic block diagram of a signal generator system, according to an embodiment.

FIG. 2 shows a system block diagram of a signal generator system 200, according to an embodiment. The signal generator system 200 includes a compute device 210 and, optionally, a compute device 220 and/or a network N1. As described herein, the compute device 210 can be associated with a first apparatus (e.g., that is functionally and/or structurally similar to the apparatus 100 of FIG. 1 and/or the apparatus 400 of FIGS. 4A-4B, each described herein), and the compute device 220 can be associated with a second apparatus (e.g., an additional, functionally and/or structurally similar instance of the first apparatus). In some embodiments, the compute device 210 and/or the compute device 220 can be configured to detect (e.g., via the network N1) the presence of and/or proximity to the other compute device 220 and/or compute device 210, respectively. In response, the compute device 210 or the compute device 220 can generate a signal that encodes an audio signal having a modified (e.g., shifted) plurality of frequencies relative to the signal generated by the other compute device 220 and/or the compute device 210, respectively. As a result, the compute device 210 and the compute device 220 can harmonize by producing sound waves that collectively have the plurality of frequencies and the modified plurality of frequencies, as described further herein.

In some implementations, the compute device 210 and/or the compute device 220 can include any suitable hardware-based computing devices and/or multimedia devices, such as, for example, a single-board computer (SBC) (e.g., a Raspberry Pi® compute device and/or the like), a server, a desktop compute device, a smartphone, a tablet, a wearable device, a laptop, a controller (e.g., a microcontroller, a microprocessor, etc.), and/or the like. In some implementations, the compute device 210 and/or the compute device 220 can be functionally and/or structurally similar to the controller 110 of FIG. 1, described herein.

The compute device 210 can include a signal generator 212, which can include software (1) stored at a memory that is functionally and/or structurally similar to the memory 310 of FIG. 3 discussed below and (2) executed via a processor that is functionally and/or structurally similar to the processor 320 of FIG. 3 discussed below. Alternatively or in addition, at least a portion of the signal generator 212 can be implemented in hardware. The signal generator 212 can be configured to generate a signal that (1) encodes an audio signal that includes a plurality of frequencies and/or (2) causes a light emitting device (e.g., functionally and/or structurally similar to the light emitting device 140 of FIG. 1) to emit light having a plurality of colors. The plurality of frequencies and/or the plurality of colors can be based on received measurement data (e.g., acceleration data), as described herein. In some implementations, the signal generator 212 can be functionally and/or structurally similar to the signal generator 222 (described below) and/or the signal generator 312 of FIG. 3, described herein.

The compute device 220 can implement a signal generator 222 that is functionally and/or structurally similar to the signal generator 212. In some implementations, the compute device 220 can be included in an apparatus that is different than the apparatus that includes the compute device 210, as described herein.

The compute device 210 can be networked and/or communicatively coupled to the compute device 220 via the network N1, using wired connections and/or wireless connections. The network N1 can include various configurations and protocols, including, for example, short range communication protocols, near-field communication (NFC), Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Communication can be facilitated by any device capable of transmitting data to and from other compute devices, such as a modem(s) and/or a wireless interface(s).

In some implementations, although not shown in FIG. 2, the signal generator system 200 can include multiple instances of compute device 210 and/or compute device 220. For example, in some implementations, each instance of compute device 210 and/or compute device 220 can be associated with a different user from multiple users. In some implementations, multiple instances of compute device 210 and/or compute device 220 can be associated with a single user, where each instance of compute device 210 and/or compute device 220 can be associated with, for example, a different set of frequencies (e.g., a different scale, a different octave, a set of tones associated with a different instrument (e.g., piano, synthesizer, saxophone, etc.), a different set of sounds (e.g., tones, percussive sounds, etc.) and/or the like. Some implementations can include various combinations of the above.

Figure 3:
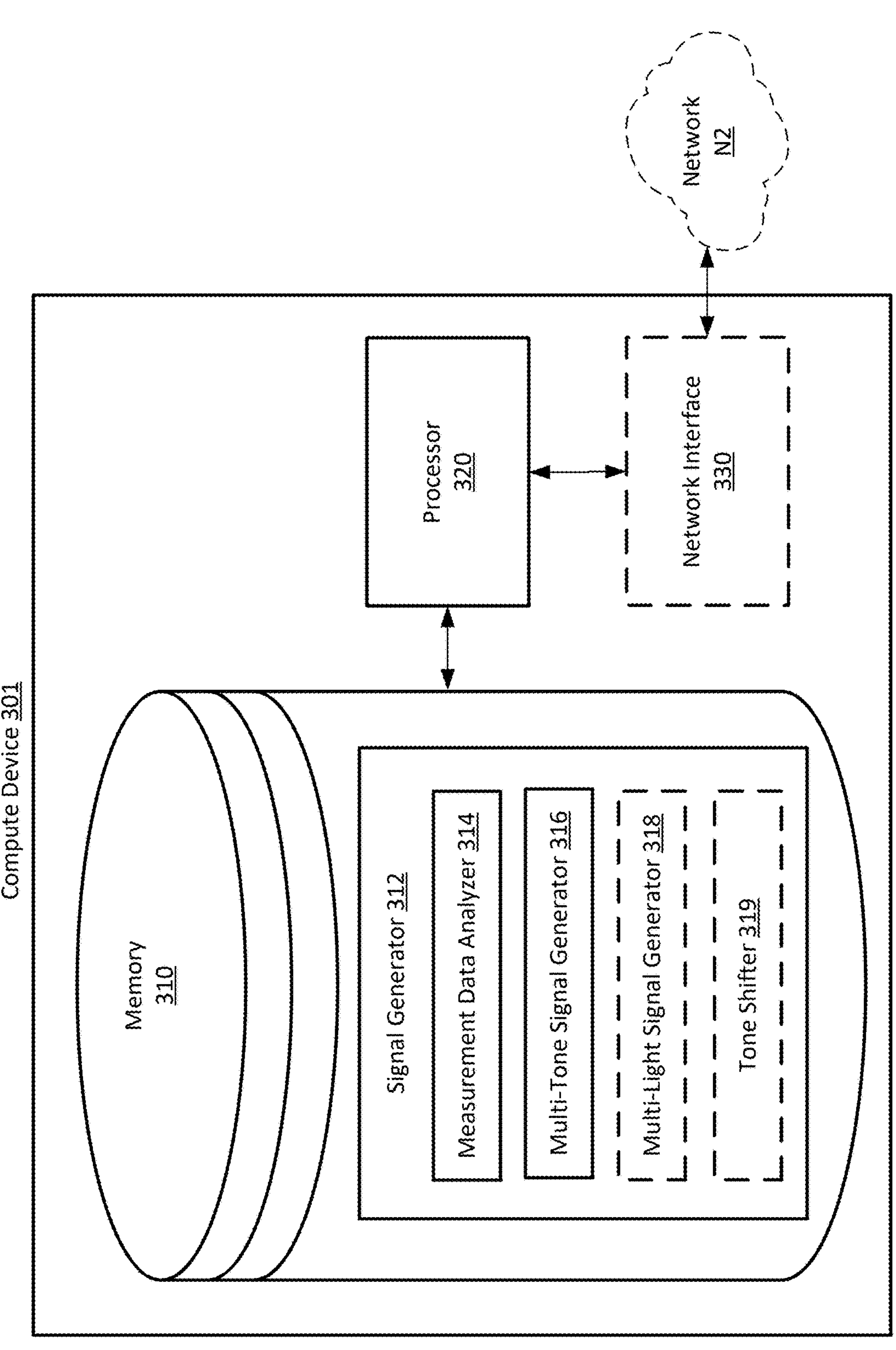
FIG. 3 is a schematic block diagram of a compute device included in a signal generator system, according to an embodiment.
Figure 4A:
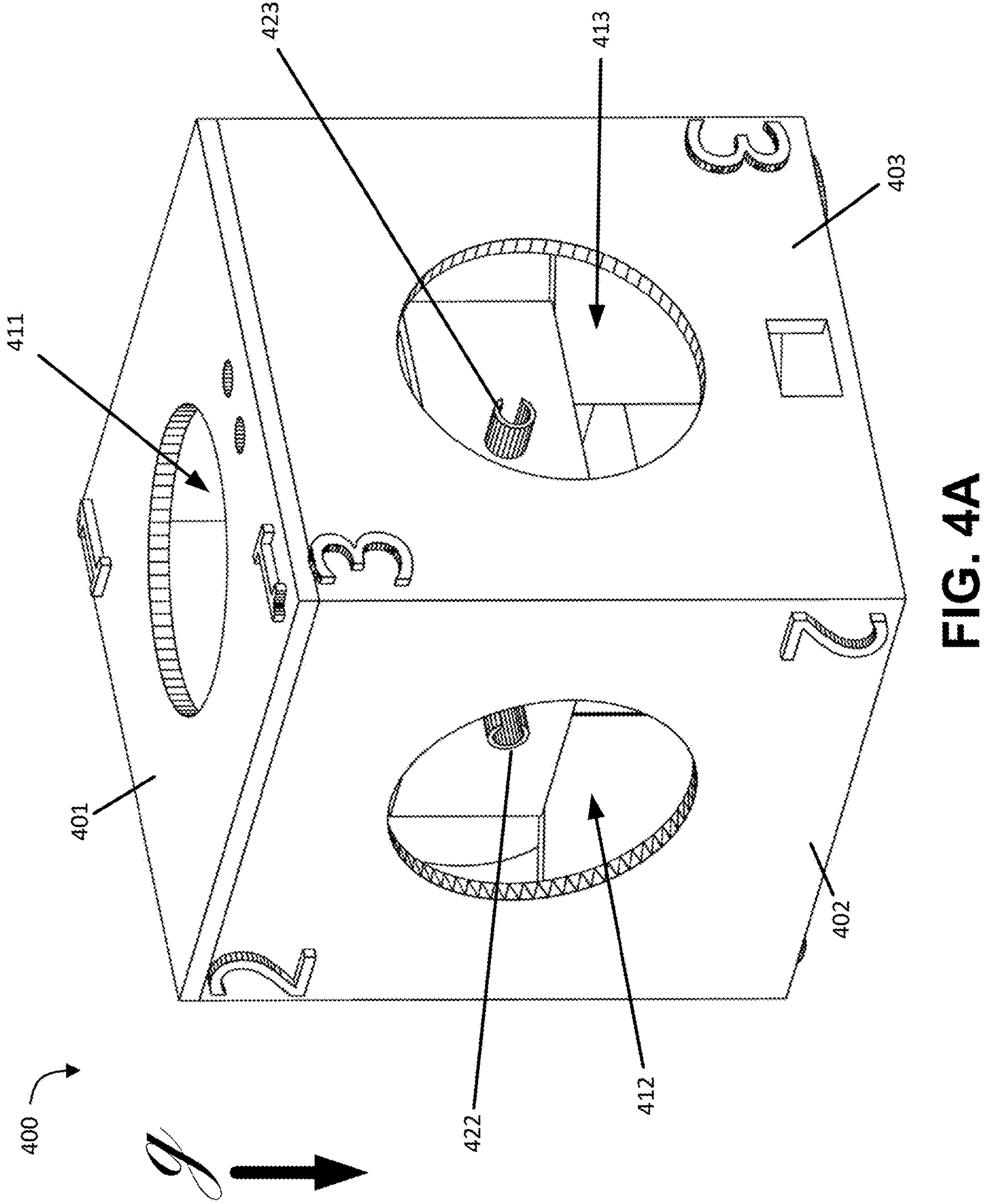
FIGS. 4A-4B are perspective views of an apparatus, according to an embodiment.
Figure 4B:
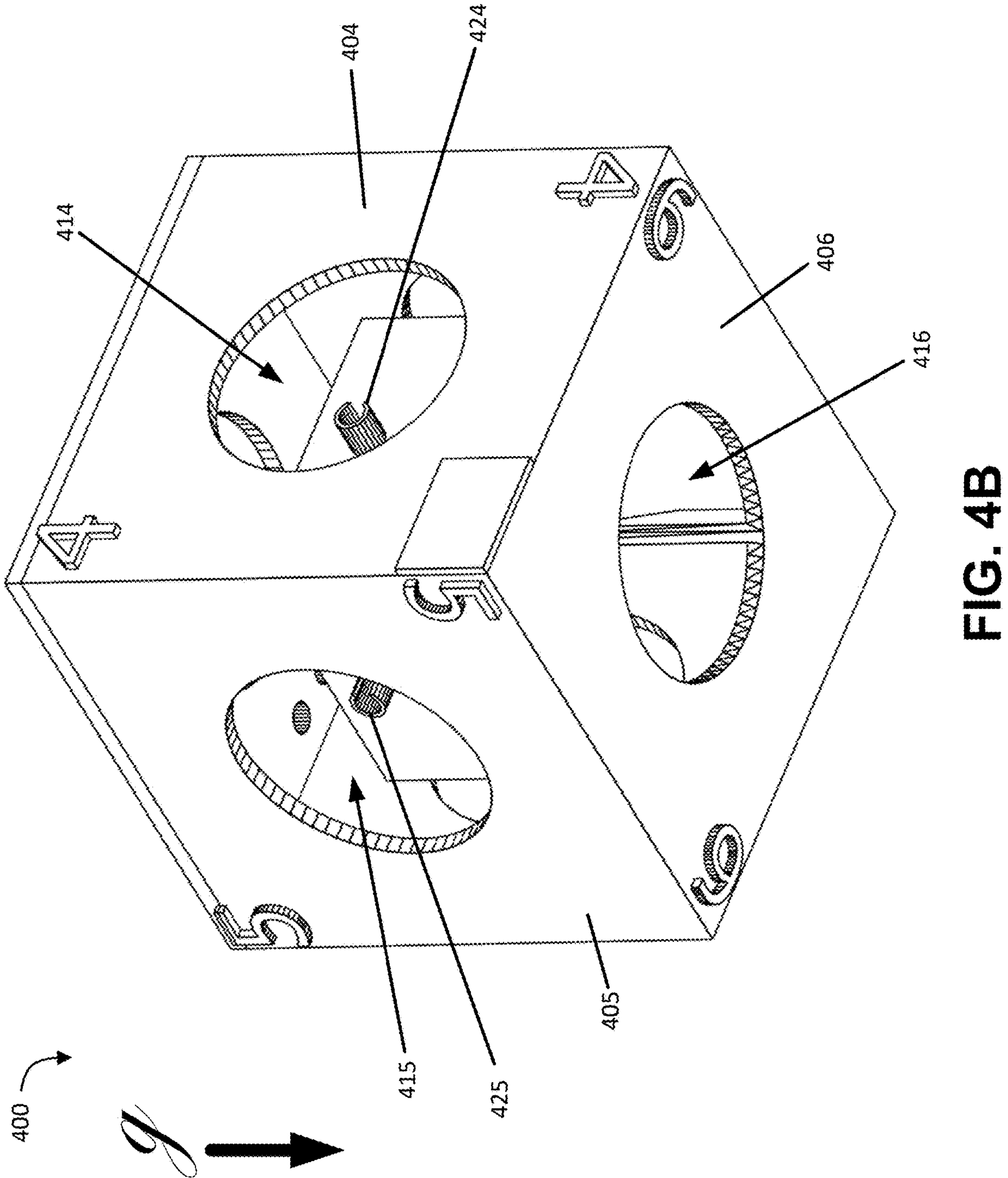

FIG. 3 shows a system block diagram of a compute device 301 included in a signal generator system, according to an embodiment. The compute device 301 can be structurally and/or functionally similar to, for example, the compute device 210 and/or the compute device 220 of the signal generator system 200 shown in FIG. 2. In some implementations, the compute device 301 can also be functionally and/or structurally similar to the controller 110 of FIG. 1, described herein. The compute device 301 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 301 includes a memory 310, a processor 320, and a network interface 330 operably coupled to a network N2.

The processor 320 can be, for example, a hardware-based integrated circuit (IC), or any other suitable processing device configured to run and/or execute a set of instructions or code (e.g., stored in memory 310). For example, the processor 320 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 320 is operatively coupled to the memory 310. In some implementations, for example, the processor 320 can be coupled to the memory 310 through a system bus (for example, address bus, data bus and/or control bus). In some implementations, the processor 320 can include multiple parallelly arranged processors.

The memory 310 can be, for example, a random-access memory (RAM), a memory buffer, a hard drive, a read-only memory (ROM), an erasable programmable read-only memory (EPROM), and/or the like. The memory 310 can store, for example, one or more software modules and/or code that can include instructions to cause the processor 320 to perform one or more processes, functions, and/or the like. In some implementations, the memory 310 can be a portable memory (e.g., a flash drive, a portable hard disk, and/or the like) that can be operatively coupled to the processor 320. In some instances, the memory can be remotely operatively coupled with the compute device 301, for example, via the network interface 330. For example, a remote database server can be operatively coupled to the compute device 301.

The memory 310 can store various instructions associated with processes, algorithms and/or data, as described herein. Memory 310 can further include any non-transitory computer-readable storage medium for storing data and/or software that is executable by processor 320, and/or any other medium, which may be used to store information that may be accessed by processor 320 to control the operation of the compute device 301. For example, the memory 310 can store data associated with a signal generator 312. The signal generator 212 can be configured to generate a signal that (1) encodes an audio signal that includes a plurality of frequencies and/or (2) causes a light emitting device to emit light having a plurality of colors. The plurality of frequencies and/or the plurality of colors can be based on received measurement data (e.g., acceleration data), as described herein. The signal generator 312 can be functionally and/or structurally similar to the signal generator 212 and/or the signal generator 222 of FIG. 2.

More specifically, the signal generator 312 includes a measurement data analyzer 314, a multi-tone signal generator 316, and optionally, a multi-light signal generator 318 and/or a tone shifter 319.

The measurement data analyzer 314 can be configured to receive measurement data from a multi-axis sensing device (e.g., functionally and/or structurally similar to the multi-axis sensing device 120 of FIG. 1). The measurement data can include, for example, acceleration data, angular velocity data, rotation angle data, and/or etc., as described herein. The measurement data can be associated with a plurality of axes, such as, for example, plurality of orthogonal axes (e.g., an x-axis, a y-axis, and a z-axis), as described herein. The measurement data analyzer 314 can identify a subset of axes from the plurality of axes based on measurement values (e.g., acceleration values, position values, rotational values, and/or the like) represented by the measurement data. For example, in some implementations, the measurement data analyzer 314 can select each axis that has an associated measurement value that is greater than a predetermined threshold, that is less than a predetermined threshold, or that is closest to a predetermined number (e.g., zero). Alternatively or in addition, in some implementations, the measurement data analyzer 314 can compare measurements across axes and select a predetermined number of axes (e.g., one out of three axes, two out of three axes, etc.) having the greatest (or lowest) measurement values as compared to remaining axes.

To illustrate the measurement data analyzer 314 in use, the measurement data analyzer 314 can receive measurement data as an apparatus (e.g., functionally and/or structurally similar to the apparatus 100 of FIG. 1 and/or the apparatus 400 of FIGS. 4A-4B, each described herein) undergoes motion (e.g., is rotated, translated, shaken, and/or the like). The measurement data can characterize this motion. For example, in some embodiments, the measurement data can include acceleration data that represents an orientation of the apparatus. More specifically, the acceleration data can capture alignment of (1) a given axis of the apparatus and/or multi-axis sensing device with (2) a direction associated with gravity. Based on this gravity-based alignment across the plurality of axes, the measurement data analyzer 314 can infer static orientation of the apparatus (e.g., which surface, face, side, etc., of the apparatus is normal and/or closest to normal to a gravitational force and/or the like). In some embodiments, the measurement data analyzer 314 can further capture transient motion of the apparatus (e.g., rotational speed, jerk, translational motion, etc.) based on the measurement data to affect, for example, modulation of produced sound, as described further herein.

The multi-tone signal generator 316 can produce signals that encode audio signals that are based on the axes, orientation, and/or motion, identified by the measurement data analyzer 314. These audio signals can have at least one frequency (e.g., for multi-tone signals, a plurality of frequencies). Examples of frequencies include 554.368 Hertz (Hz) (associated with a C #5 note), 622.368 Hz (associated with a D #5 note), 659.248 Hz (associated with an E5 note), 739.984 Hz (associated with an F #5 note), 830.608 Hz (associated with a G #5 note), 932.32 Hz (associated with an A #5 note), and/or etc. In some implementations, at least some of the possible frequencies that can be encoded by the multi-tone signal generator 316 can be defined based on those frequencies having harmonic consonance (e.g., stability) with each other when played concurrently. An electroacoustic transducer (e.g., functionally and/or structurally similar to the electroacoustic transducer 130 of FIG. 1, described herein) can receive an audio signal produced by the multi-tone signal generator 316 to produce soundwaves that have these frequencies.

To illustrate the multi-tone signal generator 316 in use, if, for example, the measurement data analyzer 314 determines that a surface of the apparatus is facing upward (or another direction) relative to gravity, the multi-tone signal generator 316 can produce a signal that encodes a frequency associated with that surface (e.g., and not other surfaces of the apparatus). If, for example, the measurement data analyzer 314 determines that two or more surfaces of the apparatus are within a threshold angle of being normal to gravity (e.g., based on multi-axis accelerometer data), the multi-tone signal generator 316 can produce a signal that encodes two or more frequencies, where each of these frequencies is associated with a different surface from the two or more surfaces.

In some embodiments, the multi-light signal generator 318 can produce signals to cause a light emitting device having a plurality of light emitters to emit light that is associated with surfaces for which the multi-tone signal generator 316 encodes frequencies. The light emitting device can be functionally and/or structurally similar to the light emitting device 140 of FIG. 1, described herein. Each light emitter (e.g., light emitting diode (LED), bulb, etc.) from the plurality of light emitters can be associated with (e.g., oriented towards) a different surface of the apparatus. In some implementations, each light emitter can be configured to produce light having a different color.

The tone shifter 319 can be configured to shift the plurality of frequencies associated with the plurality of surfaces of the apparatus in response to a switch signal (e.g., from switch that is functionally and/or structurally similar to the switch 150 of FIG. 1, described herein) and/or detected presence of another apparatus (e.g., detected via the network interface 330 and/or the network interface 160 of FIG. 1, described herein). In some implementations, the tone shifter 319 can shift the plurality of frequencies (e.g., up and/or down) by a predefined offset (e.g., by a one-third octave). In some implementations, for initial frequencies (each associated with a different surface) 554.368 Hz (associated with a C #5 note), 622.368 Hz (associated with a D #5 note), 659.248 Hz (associated with an E5 note), 739.984 Hz (associated with an F #5 note), 830.608 Hz (associated with a G #5 note), and 932.32 Hz (associated with an A #5 note), the tone shifter 319 can shift these frequencies to, respectively, 369.992 Hz (associated with an F #4 note), 415.304 Hz (associated with a G #4 note), 466.16 Hz (associated with an A #4 note), 493.888 Hz (associated with a B4 note), 554.36 Hz (associated with a C #5 note), and 662.368 Hz (associated with a D #5 note).

The network interface 330 can be configured to connect to the network N2, which can be functionally and/or structurally similar to the network N1 of FIG. 2. For example, network N2 can use any of the communication protocols described above with respect to network N1 of FIG. 2. In some implementations, the network interface 330 can include a network interface controller (NIC) that implements a physical and/or data link layer (e.g., Ethernet, Wi-Fi®, etc.). In some implementations, the network interface 330 can include a transceiver (e.g., a Bluetooth® transceiver and/or the like).

In some instances, the compute device 301 can further include a display, an input device, and/or an output interface (not shown in FIG. 3). The display can be any display device (e.g., a monitor, screen, etc.) by which the compute device 301 can output and/or display data. The input device can include, for example, a mouse, keyboard, touch screen, voice interface, switch, button, and/or any other hand-held controller or device or interface via which a user may interact with the compute device 301. The output interface can include, for example, a bus, port, and/or other interfaces by which the compute device 301 may connect to and/or output data to other devices and/or peripherals.

FIGS. 4A-4B are perspective views of an apparatus 400, according to an embodiment. The apparatus 400 can be functionally and/or structurally similar to the apparatus 100 of FIG. 1. In some embodiments, the apparatus 400 can include a compute device described herein (e.g., the compute device 210 and/or 120 of FIG. 2, the compute device 301 of FIG. 3, and/or the controller 110 of FIG. 1). The apparatus 400 includes sides 401-406, each of which defines an opening, 411-416, respectively. The apparatus 400 further includes light emitter mounts 422-425. FIGS. 4A-4B also show a gravity vector g. Although not shown in FIGS. 4A-4B, in some embodiments, the apparatus 400 can include (e.g., within an internal volume of the apparatus 400) at least one of a controller (e.g., functionally and/or structurally similar to the controller 110 of FIG. 1), a multi-axis sensing device (e.g., functionally and/or structurally similar to the multi-axis sensing device 120 of FIG. 1), an electroacoustic transducer (e.g., functionally and/or structurally similar to the electroacoustic transducer 130 of FIG. 1), a light emitting device (e.g., functionally and/or structurally similar to the light emitting device 140 of FIG. 1), and/or a network interface (e.g., functionally and/or structurally similar to the network interface 160 of FIG. 1). Alternatively or in addition, the apparatus 400 can include a switch (e.g., functionally and/or structurally similar to the switch 150 of FIG. 1) disposed on at least one of the sides 401-406.

As shown in FIGS. 4A-4B, the body of the apparatus 400 having the sides 401-406 can define a cube shape. In some embodiments not shown in FIGS. 4A-4B, however, the apparatus 400 can define a different three-dimensional shape, such as a sphere, a pyramid, a prism, a cylinder, a polyhedron (e.g., a tetrahedron, an octahedron, a dodecahedron, an icosahedron, etc.) and/or the like. In some implementations, each side can be differentiated from remaining sides of the apparatus 400 (e.g., using enumeration (as shown in FIGS. 4A-4B), using different colors, different pictures or designs, and/or etc.). In some implementations, at least one side can be associated with an axis of a multi-axis sensing device (e.g., functionally and/or structurally similar to the multi-axis sensing device 120 of FIG. 1). For example, the sides 401 and 406 can be associated with (e.g., intersected by) a first axis, the sides 402 and 404 can be associated with (e.g., intersected by) a second axis different from the first axis, and the sides 403 and 405 can be associated with (e.g., intersected by) a third axis different from the first and second axes. The multi-axis sensing device (not shown in FIGS. 4A-4B) can be disposed within an interior volume of the apparatus 400.

The plurality of openings 411-416 defined by the plurality of sides 401-406 can reveal light emitted by a light emitting device (e.g., functionally and/or structurally similar to the light emitting device 140 of FIG. 1, described herein). In some implementations, the opening 411-416 can be covered by a translucent material (e.g., translucent plastic, such as polycarbonate, acrylic, etc.) to permit emitted light to shine through the apparatus 400 to an observer.

The light emitter mounts 422-425 can include structures configured to hold light emitters of the light emitting device. Although occluded as shown in FIGS. 4A-4B, the apparatus 400 can include a light emitting device for each of the sides 401-406. In some implementations, the light emitter mounts 422-425 can be disposed to be substantially centered (e.g., within 20%) relative to respective openings 412-415 (in addition to an emitter mount also disposed to be substantially centered relative to the opening 411, and an emitter mount disposed to be substantially centered relative to the opening 416, not shown in FIGS. 4A-4B).

In use, the apparatus 400 can sound one or more tones based on, for example, orientation of the apparatus 400 relative to the gravity vector g (e.g., defined by a gravitational field that the apparatus 400 is subjected to). For example, as shown in FIGS. 4A-4B, the side 401 is oriented upward and substantially normal (e.g., within a predefined threshold angle of being oriented upward and normal) relative to the gravity vector g. In this orientation, other sides 402-406 can be oriented in a direction other than upward (e.g., beyond the predefined threshold angle of being oriented upward and normal). For example, while side 406 is oriented substantially perpendicular to the gravity vector g, the side 406 is oriented downward. The multi-axis sensing device can capture this orientation based on respective measurements captured across a plurality of axes of the multi-axis sensing device. For example, an acceleration measurement for an axis of the multi-axis sensing device can indicate a value of approximately 9.8 $m/s^2$. Moreover, in some implementation, the multi-axis sensing device can record (e.g., using negative values, signed bits, two's complement, and/or the like) direction of orientation of the axis relative to gravity (e.g., to differentiate between upward and downward orientation). Based on the orientation shown in FIGS. 4A-4B, the controller can cause the electroacoustic transducer to sound a single tone and/or frequency associated with the side 401.

From the initial orientation shown in FIGS. 4A-4B, the apparatus 400 can be rotated, such that, for example, the side 402 is more perpendicular to the gravity vector g, and the side 401 is less perpendicular to the gravity vector g. More specifically, for example, each of the sides 401 and 402 can be within a predefined threshold angle (e.g., within 66.5°, 45° and/or the like) of being perpendicular to the gravity vector g. In this orientation, the controller can be configured to cause (e.g., by generating a new signal) the electroacoustic transducer to transition from sounding the single tone and/or frequency associated with the side 401 to concurrently sounding the tone and/or frequency associated with the side 401 and the tone and/or frequency associated with the side 402. If the apparatus 400 is rotated further, such that the side 401 is more than the predefined threshold angle of being perpendicular to the gravity vector g (e.g., the side 401 is within 22.5° and/or the like from being parallel to the gravity vector), the controller can cause the electroacoustic transducer to transition to playing a single tone and/or frequency associated with the side 402. In some implementations, the apparatus 400 can be configured to sound three tones and/or frequencies concurrently. For example, the apparatus 400 can be oriented such that each of the sides 401, 402 and 403 are within the predefined threshold of being perpendicular to the gravity vector g. More specifically, for example, the apparatus 400 can be oriented such that a vertex defined by the sides 401, 402, and 403 is oriented substantially upward (e.g., such that the sides 401, 402, and 403 are each at approximately a 45° angle relative to the gravity vector g). In response, the controller can generate a signal to cause the electroacoustic transducer to concurrently play each of the respective tones associated with the sides 401, 402, and 403.

While certain examples described herein use upward orientation of a given side(s) of the apparatus 400 as the basis for the tone(s) sounded, in some implementations, other orientations (e.g., downward orientation, sidewase orientation, etc.) of a given side of the apparatus 400 can dictate which tone(s) from the plurality of tones is played. For example, in some implementations, a tone associated with the side 406 can be played based on the side 406 being oriented substantially downward (as shown in FIGS. 4A-4B). In some implementations, the apparatus 400 can include an interface(s) (e.g., a switch(es), a button(s), etc.) configured to permit a user to select a dominant orientation (e.g., upward orientation, downward orientation, sideways orientation, etc.) for which tone selection is based on.

FIG. 5 is a flow diagram illustrating a method 500 for causing an electroacoustic transducer to concurrently emit a plurality of sound waves associated with a plurality of audio frequencies, according to an embodiment. In some instances, the method 500 can be implemented by a signal generator system (e.g., the signal generator system 200 of FIG. 2) and/or a controller (e.g., the controller 110 of FIG. 1). In some implementations, the method 500 can be implemented using a processor (e.g., the processor 320 of FIG. 3) of any suitable compute device (e.g., the compute device 301 of FIG. 3 and/or the compute devices 210 and/or 220 of FIG. 2). In some implementations, the method 500 can be performed by a controller of an apparatus (e.g., the controller 110 from the apparatus 100 of FIG. 1).

The method 500 at 502 includes receiving, from a multi-axis sensing device, a signal that encodes a plurality of measurements associated with a plurality of axes. A signal that encodes a plurality of audio frequencies is generated at 504 to cause an electroacoustic transducer to concurrently emit a plurality of sound waves associated with the plurality of audio frequencies, each audio frequency from the plurality of audio frequencies being associated with a different axis from the plurality of axes. At 506, a signal is generated to cause a light emitting device to emit light (e.g., concurrently, in a predetermined sequence or pattern, alternately, etc.) (1) in a plurality of directions and (2) having a plurality of colors, each color from the plurality of colors being associated with a different direction from the plurality of directions, and each direction from the plurality of directions being associated with a different axis from the plurality of axes.

While some embodiments described herein include an apparatus configured to play tones concurrently and/or emit light concurrently, in some alternative embodiments, the apparatus (e.g., functionally and/or structurally similar to the apparatus 100 of FIG. 1 and/or the apparatus 400 of FIG. 4) can be configured to play multiple tones in alternating fashion and/or emit light via a plurality of light emitters in alternating fashion. For example, in response to the apparatus having an orientation such that multiple faces of the apparatus are within a threshold angle of being perpendicular/normal to a gravitational force, the apparatus can play multiple tones associated with those multiple faces, alternating between the multiple tones at a predefined frequency (e.g., continuously changing between the multiple tones every 0.5 seconds, every 1 second, and/or the like). Alternatively or in addition, the apparatus can alternately emit light (e.g., at the predefined frequency) from different light emitters associated with the multiple faces. In some implementations, the apparatus can continue to play the multiple tones and/or emit light via the multiple emitters (e.g., continuously or alternately) until the apparatus changes orientation (e.g., such that a face(s) is no longer within the threshold angle and/or another face(s) is within the threshold angle). In response, the apparatus can emit another frequency or frequencies, stop emitting a frequency or frequencies, emit light via another light emitter, and/or stop emitting light via a light emitter.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:

a body that defines an internal volume;

a multi-axis sensing device disposed within the internal volume and oriented based on an alignment between (1) a plurality of sides of the body and (2) a plurality of axes associated with the multi-axis sensing device;

an electroacoustic transducer disposed within the internal volume;

a processor disposed within the internal volume; and a non-transitory memory disposed within the internal volume and storing instructions that, when executed by the processor, cause the processor to:

receive, from the multi-axis sensing device, a signal that encodes a plurality of measurements associated with the plurality of axes, generate a signal that encodes a plurality of audio frequencies based on the plurality of measurements, to cause the electroacoustic transducer to concurrently emit a plurality of sound waves associated with the plurality of audio frequencies, each audio frequency from the plurality of audio frequencies being associated with a different axis from the plurality of axes, compare a measurement from the plurality of measurements and associated with an axis from the plurality of axes to a predefined threshold value, and include, in the plurality of audio frequencies, an audio frequency associated with the axis, based on the measurement being greater than the predefined threshold value.

2. The apparatus of claim 1, further comprising:

a first transceiver, the non-transitory memory further storing instructions to cause the processor to:

receive, via the first transceiver, a signal from a second transceiver, and in response to receiving the signal from the second transceiver:

generate a signal that encodes a plurality of shifted audio frequencies that is shifted by a predetermined offset from the plurality of audio frequencies, to cause the electroacoustic transducer to concurrently emit a plurality of sound waves having the plurality of shifted audio frequencies.

3. The apparatus of claim 1, further comprising:

a switch configured to produce a switch signal, the non-transitory memory further storing instructions to cause the processor to, in response to receiving the switch signal, generate a signal that encodes a plurality of shifted audio frequencies, each audio frequency from the plurality of shifted audio frequencies being an audio frequency from the plurality of audio frequencies that is shifted by a predefined offset, the electroacoustic transducer configured to concurrently emit a plurality of sound waves having the plurality of shifted audio frequencies.

4. The apparatus of claim 3, wherein the predefined offset is associated with a one-third octave.

5. The apparatus of claim 1, wherein:

the multi-axis sensing device includes a three-axis accelerometer; and the plurality of measurements includes a plurality of acceleration measurements.

6. The apparatus of claim 1, wherein the measurement is a first measurement from the plurality of measurements and the axis is a first axis from the plurality of axes, the non-transitory memory further stores instructions to cause the processor to:

compare a second measurement from the plurality of measurements and associated with a second axis from the plurality of axes to a remaining measurement from the plurality of measurements; and include, in the plurality of audio frequencies, an audio frequency associated with the second axis, based on the second measurement being greater than the remaining measurement.

7. The apparatus of claim 1, further comprising:

a plurality of light emitting devices configured to emit light having a plurality of colors, each light emitting device being disposed oriented in a different direction from a plurality of directions, each color from the plurality of colors being associated with a different direction from the plurality of directions, and each direction from the plurality of directions being associated with a different axis from the plurality of axes.

8. The apparatus of claim 1, wherein:

the body includes at least one of a cube, a pyramid, a prism, or a polyhedron, that defines the internal volume.

9. A non-transitory, processor-readable medium storing instructions that, when executed by a processor, cause the processor to:

receive, from a multi-axis sensing device, a signal that encodes a plurality of measurements associated with a plurality of axes;

compare a measurement from the plurality of measurements and associated with an axis from the plurality of axes to a remaining measurement from the plurality of measurements;

include, in a plurality of audio frequencies, an audio frequency associated with the axis, based on the measurement being greater than the remaining measurement;

generate a signal that encodes the plurality of audio frequencies to cause an electroacoustic transducer to concurrently emit a plurality of sound waves associated with the plurality of audio frequencies, each audio frequency from the plurality of audio frequencies being associated with a different axis from the plurality of axes; and generate a signal to cause a light emitting device to emit light (1) in a plurality of directions and (2) having a plurality of colors, each color from the plurality of colors being associated with a different direction from the plurality of directions, and each direction from the plurality of directions being associated with a different axis from the plurality of axes.

10. The non-transitory, processor-readable medium of claim 9, further storing instructions to cause the processor to:

receive, via a transceiver, a signal from an apparatus that excludes the non-transitory, processor-readable medium; and in response to receiving the signal from the apparatus, at least one of:

generate a signal that encodes a plurality of shifted audio frequencies that is shifted by a predetermined offset from the plurality of audio frequencies, to cause the electroacoustic transducer to concurrently emit a plurality of sound waves having the plurality of shifted audio frequencies.

11. The non-transitory, processor-readable medium of claim 9, further storing instructions to cause the processor to:

receive a signal that encodes a user selection; and in response to receiving the signal that encodes the user selection, generate a signal that encodes a plurality of shifted audio frequencies that is shifted by a predefined offset from the plurality of audio frequencies, to cause the electroacoustic transducer to concurrently emit a plurality of sound waves having the plurality of shifted audio frequencies.

12. The non-transitory, processor-readable medium of claim 11, wherein the predefined offset is associated with a one-third octave.

13. The non-transitory, processor-readable medium of claim 9, wherein:

the multi-axis sensing device includes a three-axis accelerometer; and the plurality of measurements includes a plurality of acceleration measurements.

14. The non-transitory, processor-readable medium of claim 9, wherein the measurement is a first measurement from the plurality of measurements and the axis is a first axis from the plurality of axes, the non-transitory, processor-readable medium further storing instructions to cause the processor to:

compare a second measurement from the plurality of measurements and associated with a second axis from the plurality of axes to a predefined threshold value; and include, in the plurality of audio frequencies, an audio frequency associated with the second axis, based on the second measurement being greater than the predefined threshold value.

15. A system, comprising:

a body that defines an internal volume;

a multi-axis sensing device disposed within the internal volume;

an electroacoustic transducer disposed within the internal volume;

a light emitting device disposed within the internal volume;

a processor disposed within the internal volume; and a non-transitory, processor-readable medium disposed within the internal volume and storing instructions that, when executed by the processor, cause the processor to:

receive, from the multi-axis sensing device, a signal that encodes a plurality of measurements associated with a plurality of axes, compare a measurement from the plurality of measurements and associated with an axis from the plurality of axes to a remaining measurement from the plurality of measurements, include, in a plurality of audio frequencies, an audio frequency associated with the axis, based on the measurement being greater than the remaining measurement, generate a signal that encodes the plurality of audio frequencies to cause the electroacoustic transducer to concurrently emit a plurality of sound waves associated with the plurality of audio frequencies, each audio frequency from the plurality of audio frequencies being associated with a different axis from the plurality of axes, and generate a signal to cause the light emitting device to emit light (1) in a plurality of directions and (2) having a plurality of colors, each color from the plurality of colors being associated with a direction different from at least one remaining direction from the plurality of directions, and each direction from the plurality of directions being associated with a different axis from the plurality of axes.

16. The system of claim 15, wherein the plurality of measurements is a first plurality of measurements, the plurality of axes is a first plurality of axes, the plurality of audio frequencies is a first plurality of audio frequencies, the plurality of sound waves is a first plurality of sound waves, the plurality of directions is a first plurality of directions, and the plurality of colors is a first plurality of colors, the non-transitory, processor-readable medium further storing instructions to cause the processor to:

receive, from the multi-axis sensing device, a signal that encodes a second plurality of measurements associated with a second plurality of axes different from the first plurality of axes;

generate a signal that encodes a second plurality of audio frequencies different from the first plurality of audio frequencies, to cause the electroacoustic transducer to transition from concurrently emitting the first plurality of sound waves to concurrently emitting a second plurality of sound waves associated with the second plurality of audio frequencies, each audio frequency from the second plurality of audio frequencies being associated with a different axis from the second plurality of axes; and generate a signal to cause the light emitting device to emit light (1) in a second plurality of directions different from the first plurality of directions and (2) having a second plurality of colors different from the first plurality of colors, each color from the second plurality of colors being associated with a direction different from at least one remaining direction from the second plurality of directions, and each direction from the second plurality of directions being associated with a different axis from the second plurality of axes.

17. The system of claim 15, wherein:

the plurality of audio frequencies is associated with harmonic consonance.

18. The system of claim 15, wherein:

the body includes a plurality of translucent surfaces, each translucent surface (1) being normal to a different direction from at least one remaining direction from the plurality of directions and (2) permitting light having a different color from at least one remaining color from the plurality of colors to be emitted beyond an internal volume defined by the body.

19. The apparatus of claim 1, wherein the electroacoustic transducer is a first electroacoustic transducer, the apparatus further comprising:

a first transceiver, the non-transitory memory further storing instructions to cause the processor to:

receive, via the first transceiver, a signal from a second transceiver, and in response to receiving the signal from the second transceiver:

send a signal via the first transceiver to cause a second electroacoustic transducer to emit a plurality of shifted audio frequencies that is shifted by a predetermined offset from the plurality of audio frequencies.

20. The non-transitory, processor-readable medium of claim 9, further storing instructions to cause the processor to:

receive, via a transceiver, a signal from an apparatus that excludes the non-transitory, processor-readable medium; and in response to receiving the signal from the apparatus:

generate a signal via the transceiver to cause an electroacoustic transducer of the apparatus to emit a plurality of shifted audio frequencies that is shifted by a predetermined offset from the plurality of audio frequencies.

* * * * *